United States Patent [19]

Iverson et al.

[11] 3,899,405

[45] Aug. 12, 1975

[54] METHOD OF REMOVING HEAVY METALS FROM WATER AND APPARATUS THEREFOR

[75] Inventors: Marlowe L. Iverson, Simi; Lowell R. McCoy, Woodland Hills, both of Calif.

[73] Assignee: Rockwell International Corporation, El Segundo, Calif.

[22] Filed: June 7, 1974

[21] Appl. No.: 477,531

Related U.S. Application Data

[63] Continuation-in-part of Ser. No. 240,058, March 31, 1972.

[52] U.S. Cl. .................. 204/149; 204/1 R; 204/130
[51] Int. Cl.² .... B01K 3/00; B01K 3/02; C02B 1/82
[58] Field of Search ........... 204/149, 130, 131, 152, 204/124, 1 R, 120, 54

[56] References Cited
UNITED STATES PATENTS 3,457,152   7/1969   Maloney, Jr. et al. ............... 204/131

*Primary Examiner*—John H. Mack
*Assistant Examiner*—A. C. Prescott
*Attorney, Agent, or Firm*—L. L. Humphries; C. E. DeLarvin; H. Kolin

[57] ABSTRACT

A method of removing heavy metals such as mercury, nickel, zinc, lead, cadmium, and copper from contaminated aqueous solutions, such as waste waters, including the steps of passing the aqueous solution through an electrochemical cell containing an oxidation resistant anode and a cathode comprising a bed of tin or tin-coated particles; electroplating (and amalgamating in the case of mercury) the heavy metal in solution onto the surface of the tin or tin-coated particles in the electrochemical cell; and discharging the aqueous solution substantially free of heavy metal.

13 Claims, 3 Drawing Figures

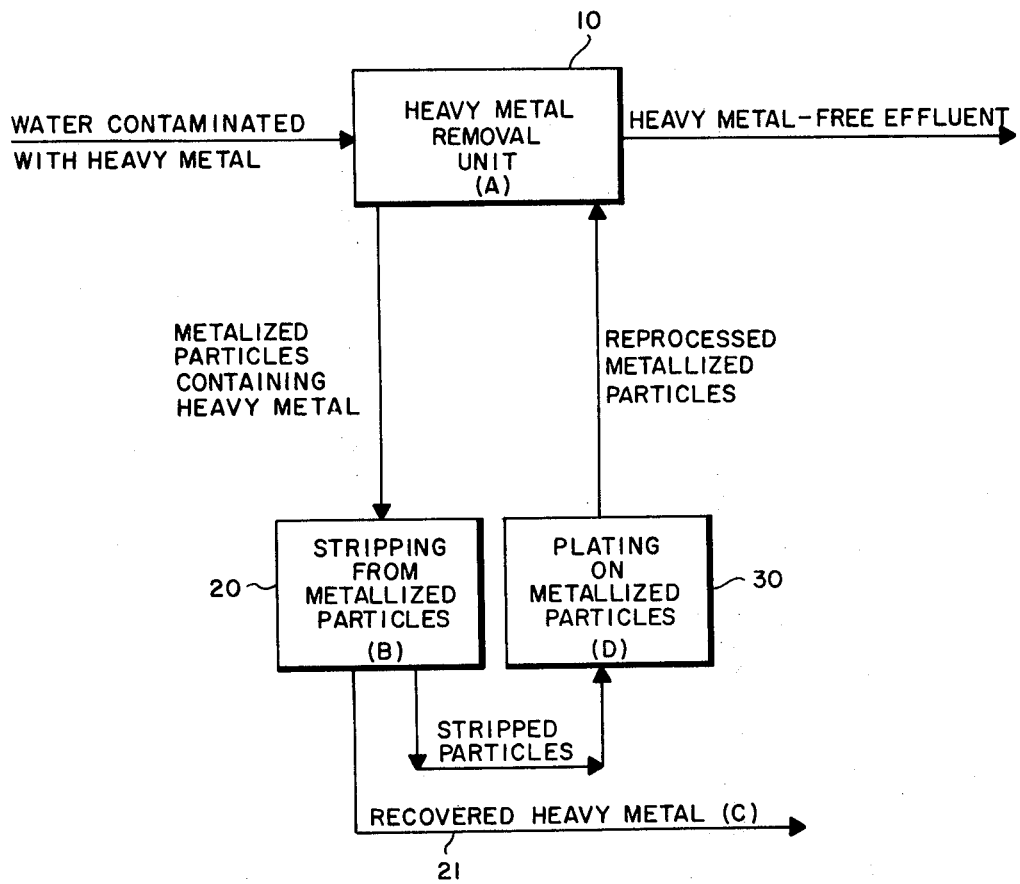
FIG. 1
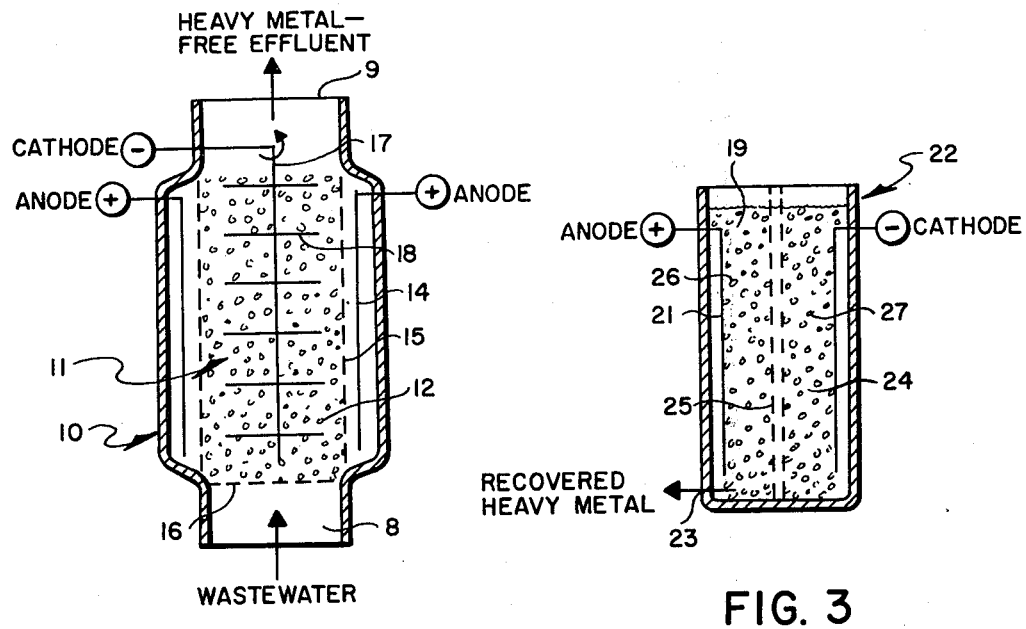
FIG. 2
FIG. 3

METHOD OF REMOVING HEAVY METALS FROM WATER AND APPARATUS THEREFOR

CROSS REFERENCE TO RELATED APPLICATIONS

This application is a continuation-in-part of Application Ser. No. 240,058 filed Mar. 31, 1972 and assigned to the Assignee of the present application.

It is noted that Application Ser. No. 477,530, filed of even date herewith, is also a continuation-in-part of application Ser. No. 240,058 filed Mar. 31, 1972 and assigned to the Assignee of the present application.

BACKGROUND OF THE INVENTION

1. Field of the Invention

This invention is directed to the electrochemical removal of heavy metal from waste waters. It is particularly directed to a heavy metal-removal and regeneration method suitable for recovery of the removed heavy metal.

There is considerable and growing concern over contamination of the nation's waterways with heavy metals. Mercury, for example, is known to be a neuropoison, being especially dangerous in the alkyl mercury form often found in water and aquatic life. Cadmium in river water has been identified as the cause of a painful disease (itai itai). Lead and other heavy metals are suspected of being dangerous pollutants in our waters.

Many of these heavy metals enter our waters from industrial sources, such as metal finishing plants and from mining sources. Recent steps to limit the pollution from these sources, e.g., in the case of mercury from chloralkali plants, have been relatively effective. However, some reduced but significant quantities of these heavy metals will continue to come from industries and mines unless treatment specifically directed toward heavy-metal removal is given.

Heavy-metal contamination may also arise from "natural" sources, e.g., mercury at levels to cause concern has been found in lakes where little, if any, human activity has occurred. To clean up these waters, the only course open is to treat them to remove the specific heavy-metal contaminants.

2. Prior Art

Various methods are reported to be available and in use for removal of different heavy metals from water. The method currently commercially available for metal removal, e.g., chemical precipitation, reverse osmosis, ion exchange, and absorption, are generally costly, require elaborate equipment, are specific for only a few metals, or present serious waste disposal problems. In addition, they are, in general, not able to attain the very low effluent metal levels contemplated in prospective future governmental regulations dealing with water contamination. Thus, certain of these methods merely substitute one undesirable metal ion in place of the metal ion being removed.

For mercury, chemical treatment (e.g., with $FeCl_2$) or $Na_2S$) to form elemental mercury or an insoluble mercury compound has been used. A process involving ion exchange as one of its many steps is claimed to be effective. U.S. Pat. Nos. 3,083,079 and 3,085,859 show specific mercury removal processes. However, with low mercury concentration, the chemical methods require a large quantity of inert carrier solids for efficient separation. This in turn requires the handling and disposal of large volumes of precipitate in order to remove the mercury. The ion-exchange process generates a mercury-loaded resin which cannot be regenerated and must be disposed of.

For other heavy metals, either the situation is similar or no satisfactory treatment method exists. Early use of zinc particles as a filtering medium for separating metals and purifying water is seen in U.S. Pat. Nos. 418,138 and 634,462. U.S. Pat. Nos. 1,743,525 and 1,789,425 use a filter medium of metallic filaments, mentioning zinc but no chemical action or release of zinc ions to the solution are mentioned. Karpiuk et al (U.S. Pat. Nos. 3,029,143 and 3,029,144) make use of sodium amalgam to remove mercury from solutions using steel or nonmetallic beds. Amalgam and mercury metal accumulate below the bed where it is removed for further treatment. Town (U.S. Pat. No. 3,361,559) shows a process of precipitating elemental mercury from an aqueous solution of sodium sulfide-sodium hydroxide containing mercury by the addition of elemental antimony to the solution. U.S. Pat. Nos. 3,039,865 and 3,704,875 show additional processes of recovering mercury from aqueous solutions.

U.S. Pat. No. 3,457,152 shows an electrolytic process for removing trace quantities of metals from an aqueous solution, particularly applicable for electrohydrodimerization reactions. The electrolytic apparatus utilizes a cathode comprising a body of lead shot, other metals possessing similar hydrogen overvoltage such as zinc or cadmium being mentioned as alternative cathode materials. In U.S. Pat. No. 3,728,238 there is shown a process for decreasing the hexavalent chromium content of a liquid by having a bed of dispersed particles in the electrolyte. In U.S. Pat. No. 3,791,520 water contaminated with hexavalent chromium is contacted with a water insoluble lead compound adsorbed in the pores of a particulate matrix. In U.S. Pat. No. 3,764,499 a process is shown for removal of contaminants from waste waters utilizing a membrane partitioned electrolytic cell in which the electrolytic chambers are filled with various granular fibers or segmented electric conductors.

SUMMARY OF THE INVENTION

The present invention provides a method of and apparatus for removing heavy metals from an aqueous solution containing the same. The apparatus comprises an electrochemical cell including a liquid containing means, liquid inlet and outlet means, an oxidation resistant anode, a cathode comprising a body of particles having tin surfaces and electrical means for the passage of a direct electric current between said anode and cathode.

Broadly, the method comprises passing the aqueous solution containing heavy metals through a bed of tin or tin-coated particles and passing a direct current from an anode through the solution and the particles whereby the heavy metal is deposited upon the particles. After a desired amount of the heavy metal has been deposited upon the particles, the particles then may be transferred from the cell and regenerated using either an electrochemical or chemical technique. Alternatively, in situ regeneration may be used. It has been found that tin is particularly effective when the aqueous solution contains mixtures of various heavy metals such as, for example, mercury, nickel, zinc, lead, cadmium and copper.

DESCRIPTION OF THE DRAWINGS

FIG. 1 is a process flow diagram;
FIG. 2 is a cross-sectional schematic view of a typical heavy-metal removal unit; and
FIG. 3 is a cross-sectional schematic view of a regeneration and heavy-metal recovery unit.

DETAILED DESCRIPTION

A flow diagram for the system using the novel heavy-metal removal method and apparatus is shown in FIG. 1. The method shown involves four main steps: (A) the collection of heavy metal from water in heavy-metal removal electrochemical unit 10 containing tin-coated collector particles involving the deposition of the heavy metal (and amalgamation in the case of mercury) on the tin; (B) electrolytic stripping of the heavy metal from the collector particles by stripping unit 20; (C) removal of heavy metal from the stripping unit by line 21; and (D) electroplating tin back onto the collector particles in a plating cell 30 and returning the tin-plated collector particles back to the removal unit 10. In the removal unit an electrical potential is applied between the tin-plated collector particles and an anode so that (a) electrochemical rather than chemical deposition of the heavy metal takes place, and (b) less easily reduced forms of heavy metal may be deposited. Operations (B) and (D) may be carried out in a single cell.

In the removal process of Step A when the heavy metal is mercury, it forms an amalgam with the tin on the coated particles. For use in a fluidized bed electrochemical unit (FIG. 2), the particles preferably should be of essentially uniform size and density to allow the collector particles to be conveniently and repeatedly reprocessed in the steps described. Agitation of the collector particles in the fluidized bed is provided by action of the incoming waste water or by rotation of the cathode (FIG. 2). Agitation will provide effective transport of the heavy-metal contaminants to the collector surface, allow suspended solids to move through the bed, prevent clogging or buildup of sludge in the bed, provide a burnishing action to densify the tin coating on the particles, thereby maintaining a reactive and adhering surface, and maintain a uniform distribution of mercury over the entire bed.

For use in a fluidized bed, round lightweight balls are preferred for use as the collector particles. Tin-coated nonmetallic substrates such as solid or hollow glass or plastic beads serve this purpose. A primary metal layer such as silver, nickel, or copper is deposited by electroless plating or other means to impart electrical conductivity of the nonmetallic substrate. Copper or nickel is preferred as the base or primary metal layer for reasons of cost.

A suitable electroless process is seen in U.S. Pat. Nos. 2,532,283 and 2,532,284. The tin coating then is applied by conventional electroplating, such as by deposition in a conventional plating bath.

Use of plastic balls instead of glass yields a lower overall density and permits lower flow rates to achieve a given degree of fluidization when such is desired. Smaller balls of either type would do likewise. A cylindrical cell is practical and effective. Some taper in the cylinder may improve uniformity of fluidization. Uniformity may also be improved by tangential entrance of the water, flow baffles, or use of air jets.

The selection of tin for removal of the heavy metals is based on the following: (1) it is effective in removing mixtures of heavy metals from aqueous solutions containing the same; (2) tin has favorable electrochemical properties for reprocessing; specifically, it can be easily separated from the heavy metal and recycled; (3) tin generally is considered to be non-toxic as an impurity in water, thus any small loss of tin to the treated water will be relatively innocuous; and (4) it forms a substantially inert oxide coating when used in accordance with the method of the present invention, thus substantially no measurable amount of tin is lost in solution.

The water to be treated must have some dissolved salt content for electrolytic conductivity so that the electrolytic cell process may occur. This salt will normally be present in the effluent being processed but, if needed, addition of a small amount of a salt to a heavy metal containing water may be made to enable it to be treated without serious effect on subsequent use of the water. Various salts may be used, but NaCl is preferred for its low cost and the fact that its presence in effluent water is less objectionable than would be some others, e.g., nitrates. Strongly acid or strongly basic waters should preferably be adjusted to a more nearly neutral pH before treatment. This will not seriously affect the applicability of the method in that contaminated water having a pH value suitable for legal discharge is suitable for treatment by this method. The conductivity of the solution should be at least that of a solution containing 100–200 ppm of dissolved salts (NaCl). A conductivity equivalent to that of a solution containing 200 ppm to 3.5% salt (NaCl) content is a preferred range.

The method is applicable to the removal of various forms of mercury, for example, elemental and soluble and relatively insoluble inorganic compounds, including methyl mercury. Further, the method also removes substantial amounts of compounds of other heavy metals such as Pb, Au, Ag, Cd, Cu, and Zn. Other metal compounds such as Sb, Sn, Bi and Ni also are removed.

The operating parameters (size of cell, current, size of balls) for optimum removal will differ for the particular form of the particular heavy metal. Waters from a few ppb to over 100 ppm of a heavy-metal impurity may be treated. It should be noted, though, that a given quantity of metal may be removed more easily and economically the more concentrated it is.

FIG. 2 shows a schematic of the apparatus of the invention, viz., a metal removal unit 10 which comprises an electrolytic cell, usable to perform Step A. The water (waste water) containing at least one heavy metal ion selected from the group consisting of mercury, lead, zinc, cadmium, copper and nickel passes upward through inlet means 8 and through a bed 11 of tin-coated balls 12, which bed acts as a cathode in the electrolytic cell. A potential is applied to the balls by their contact with each other and with a cathodically polarized screen or plate 13. The heavy metal is deposited on (and amalgamated with in the case of mercury) the tin coating on the balls 12. The water leaves the cell 10 as an effluent essentially free of heavy metal through outlet means 9. An anode 14 is provided which is kept separated from and out of contact with the balls 12 by a porous separator 15. The separator normally comprises a perforated cylinder having a perforated bottom 16 which aids in holding the balls 12. At the anode 14, evolution of a small amount of oxygen or chlorine or a mixture of these occurs simultaneously with the heavy metal removal process. The cathode comprises a central collector rod 17 having rods 18 spaced in a vertical plane along its length, the rods preferably being made of tin-plated steel. The anode 14 is a right circular cylinder made of an oxidation resistant material such as carbon, graphite, tantalum, titanium, stainless steels and the metals of Group VIII of the Periodic Table. Electrical means are provided for the passage of a direct electric current between the cathode and anode such as, for example, suitable terminals on each of the anode and cathode connected to a direct current source (not shown). A voltage potential is applied across the cell in a preferred range of from about 2 to 12 volts. The flow rate of the waste water through electrochemical unit 10 is dependent on amount of heavy metal removal desired, residence time, and fluid velocity, and may range from small units processing 1 to 25 gpm up to large units handling from 1000 to 5000 gpm or larger. Generally the unit will be sized or the flow rate adjusted to provide an average residence time of the solution in the bed of from about 0.5 to about 4 minutes.

Upon the application of a potential to the collector or balls 12, heavy metal cations are deposited by the reaction:

$$M^{+n} + ne^- \rightarrow M.$$

With metallic mercury, the reaction also is one of amalgamation:

$$Hg + Sn = Sn(Hg) \text{ amalgam}.$$

Tin is not released in these reactions and does not enter the water as a contaminant.

The application of a voltage potential substantially eliminates any corrosion of the tin. Whereas zinc is thermodynamically unstable in the presence of water and aqueous solutions and tends to dissolve with the evolution of hydrogen, tin forms an oxide film when used in accordance with the present method and is stable. Further, tin is more receptive to all of the heavy metals than, for example, zinc. Tin is more expensive than zinc; however, the advantages obtained using tin in accordance with the present method (stability in solution, high hydrogen overvoltage, receptiveness to all heavy metals and relative non-toxicity) more than offset its higher cost.

The application of a negative potential to the tin collector particles speeds up sluggish reactions and promotes the deposition of the heavy metal from relatively stable compounds, thus making the method useful for a range of conditions. In the electrochemical process, substantially no measurable amount of tin is released to the water. In fact, any tin which may tend to be released in a chemical mode also would tend to be redeposited under the applied potential.

Steps B, C, and D may be carried out together as shown in FIG. 3. The heavy metal, tin-coated balls 26 are fed into the anode compartment 21 of a fluidized or rotating particle bed cell 22. Here, the tin and heavy metals are stripped off, tin ions and heavy metal ions other than mercury thereby going into solution in the electrolyte 19. Mercury is left behind as the tin is stripped away from the collector particles. The mercury will be in the form of droplets which will coalesce and fall to the bottom of the container. The mercury then can be removed through outlet 23 and recovered for use. When fully stripped, the balls 27 are transferred to the cell cathode compartment 24 where they are tin plated. The plated balls then are recycled to the removal unit shown in FIG. 2. Cell 22 contains a separator 25 which divides the compartmented cell. The separator is porous, allowing access of the tin-ion-containing electrolyte, such as $SnO^{--}$ in a KOH solution, from the anode side to the cathode side of the cell. The rotating particle bed cell may comprise that shown in U.S. patent application Ser. No. 16,203 filed Mar. 3, 1970, now U.S. Pat. No. 3,663,298.

With a bed designed for intermittent or constant fluidization, waste waters with suspended solids are amenable to treatment. For example, raw sewage generally contains a large amount of suspended solids and would be likely to foul the system. It now is feasible to treat such sewage for mercury removal. This would prevent the mercury contaminant from interfering with biological (secondary) treatment. A constant or intermittent agitation of the fluidized bed will tend to minimize any fouling due to organic growth on the particles and other cell components. Slurries consisting, for example, of mud drawn from benthic layers in lakes and streams may be treated. Thus, mercury or other heavy metals which have accumulated in lakes and estuaries may be removed using this method.

EXAMPLE

To demonstrate the efficacy of tin to remove heavy metals from aqueous solutions in accordance with the present method, the following tests are performed. Three heavy metal containing solutions (A, B and C) are prepared, each having the composition as set forth in the table below. Each of the solutions are passed through an electrochemical cell containing a graphite anode and a cathode comprising a bed of particulate tin. An applied potential within the range from about 2–12 volts is maintained between the anode and the tin particles. The average residence times of the heavy metal containing solutions in the particulate bed are calculated and set forth in the table below. The effluent solutions from the electrochemical cell are sampled, analyzed, and the results of the analyses also are as set forth in the table below.

TABLE

|  | Solution A+ |  |  |  | Solution B+ |  |  | Solution C* |  |
|---|---|---|---|---|---|---|---|---|---|
| Heavy Metal Species | Hg | Cu | As | $Cr^\Delta$ | Zn | Cu | Cd | Cu | Ni |
| Initial Concentration (ppm) | 3.0 | 0.11 | 7 | 0.9 | 0.9 | 0.14 | 0.88 | 0.14 | 0.08 |
| Effluent Concentration (ppm) | 0.002 | ND | 3 | 0.05 | 0.33 | ND | 0.17 | 0.007 | ND |
| Residence Time (min) | 0.75 | 0.57 | 0.73 | 0.75 | 0.75 | 0.75 | 2.16 | 2.16 | 2.16 |

ND = Not Detected. This is < 10 ppb for Ni, and ≤ 5 ppb for Cu.
+Solutions A and B also contained 220 ppm $NaSO_4$.
*Solution C also contained 100 ppm NaCl.
$\Delta$ Chromium is not deposited, rather it is precipitated as an insoluble hydroxide.

From the foregoing table it is seen that tin, when used in accordance with the present method, is highly effective in removing substantial quantities of various heavy metals.

After a desired amount of the heavy metal has been deposited upon the particulate tin, the heavy metal may be recovered and the tin regenerated using either electrochemical or chemical techniques. An example of an electrochemical technique is described hereinbefore.

The use of tin also permits recovery of the heavy metal and regeneration of the tin using a relatively inexpensive chemical technique. More particularly, a solution of dilute nitric acid, for example, attacks tin slowly because of the formation of relatively insoluble stannic acid. Heavy metals such as copper and nickel, however, are actively oxidized and dissolved by dilute nitric acid with the formation of soluble nitrate salts.

The foregoing example and description are for purposes of illustration only and should not be construed as limiting the scope of the invention; reference being had to the appended claims for such latter purpose.

We claim:

1. A method of removing a heavy metal from an aqueous solution containing the same comprising:
   passing the solution through an electrochemical cell containing an anode and a cathode comprising a bed of particles having tin surfaces, contacting said particles with a cathodically polarized collector,
   passing a direct current from said anode through the solution to said particles whereby heavy metal is removed from the solution and deposited on the tin surfaces of said particles and
   discharging the aqueous solution of reduced heavy metal content.

2. The method of claim 1 wherein said particles are particulate tin.

3. The method of claim 1 wherein said particles are tin-coated nonmetallic substrates.

4. The method of claim 1 wherein an applied potential of from about 2 to 12 volts is maintained between said anode and said particles.

5. The method of claim 1 wherein said heavy metal is selected from the group consisting of mercury, nickel, zinc, cadmium and copper.

6. The method of claim 1 wherein said bed of particles is intermittently fluidized.

7. The method of claim 1 wherein the solution has a residence time in said bed within the range of from about 0.5 to about 4 minutes.

8. The method of claim 1 wherein the heavy metal is at least one metal selected from the group consisting of copper and nickel.

9. The method of claim 1 wherein said bed of particles is continuously fluidized.

10. The method of claim 1 wherein said heavy metal is recovered from said particles.

11. The method of claim 10 wherein the heavy metal is recovered by contacting the bed of particles with an aqueous solution of nitric acid.

12. A method of removing heavy metal from an aqueous solution comprising:
   passing an aqueous solution containing at least one heavy metal selected from the group consisting of mercury, nickel, zinc, cadmium and copper through an electrochemical cell containing an anode and a cathode, said cathode comprising a bed of particles having tin surfaces;
   contacting said bed of particles with a cathodically polarized collector;
   maintaining an applied potential of between about 2 to 12 volts between the anode and cathode and passing a direct electric current therebetween, whereby the heavy metal is deposited on the tin surfaces of the particles; and
   discharging the aqueous solution of reduced heavy metal content.

13. The method of claim 12 wherein the aqueous solution is passed through said electrochemical cell at a rate sufficient to provide a residence time in said bed of particles of from about 0.5 to about 4 minutes.

* * * * *